United States Patent [19]

Jackson

[11] 3,931,481

[45] Jan. 6, 1976

[54] PLURAL LINE SELECTOR APPARATUS FOR ENABLING SELECTION OF ONE OF A PLURALITY OF TELEPHONE LINES

[75] Inventor: Joseph Monroe Jackson, Menlo Park, Calif.

[73] Assignee: Litton Business Telephone Systems, Inc., Sunnyvale, Calif.

[22] Filed: Sept. 20, 1974

[21] Appl. No.: 507,927

[52] U.S. Cl. .................................... 179/99; 317/137

[51] Int. Cl.² .......................................... H04Q 3/00

[58] Field of Search .......... 179/99, 18 BB; 307/241, 307/242, 247 R, 247 A; 317/136, 137; 340/166 R

[56] References Cited

UNITED STATES PATENTS

| | | | |
|---|---|---|---|
| 2,971,135 | 2/1961 | Ebert | 317/136 |
| 3,150,238 | 9/1964 | Carter | 179/99 |
| 3,296,499 | 1/1967 | Quinlan | 307/242 |
| 3,469,151 | 9/1969 | Newland | 317/136 |
| 3,541,515 | 11/1970 | Walter et al. | 317/137 |
| 3,560,939 | 2/1971 | Lukas | 307/241 |
| 3,597,737 | 8/1971 | Wallace et al. | 317/136 |
| 3,691,431 | 9/1972 | Hendrickson | 317/136 |
| 3,757,056 | 9/1973 | Foulkes | 179/99 |

*Primary Examiner*—Kathleen H. Claffy
*Assistant Examiner*—Randall P. Myers
*Attorney, Agent, or Firm*—Ronald M. Goldman

[57] ABSTRACT

An electronic selector switch is disclosed that enables selection of one of a plurality of output circuits. The selector contains a plurality of bistable electronic switch means, each of which includes a first "set" input and a second "reset" input; a corresponding plurality of momentary contact switches; each momentary contact switch has an output connected in circuit with the "set" input of a corresponding one of the plurality of bistable electronic switch means; a corresponding plurality of logic circuit means with the output thereof connected to the "reset" input of a corresponding one of the plurality of bistable electronic switch means and with the inputs thereof coupled to the output of all said momentary contact switch means associated with all of the other electronic switch means, but not the output of that one of said momentary contact switch connected in circuit with the set input of the associated electronic switch, whereby operation of a selected one of said selector switch means enables operation of the one of said electronic switch means associated therewith to the "set" condition and "resets" the remainder of said bistable switch means. In combination therewith an additional electronic switch means is provided for producing an output for only a predetermined short interval. In this a momentary contact switch means is connected to the input of the last-named electronic switch for enabling said additional electronic switch means. And means for generating a pulse upon the release of said momentary contact switch means and coupling said pulse, directly or indirectly, to the "reset" inputs of all of the aforedescribed bistable electronic switch means.

7 Claims, 1 Drawing Figure

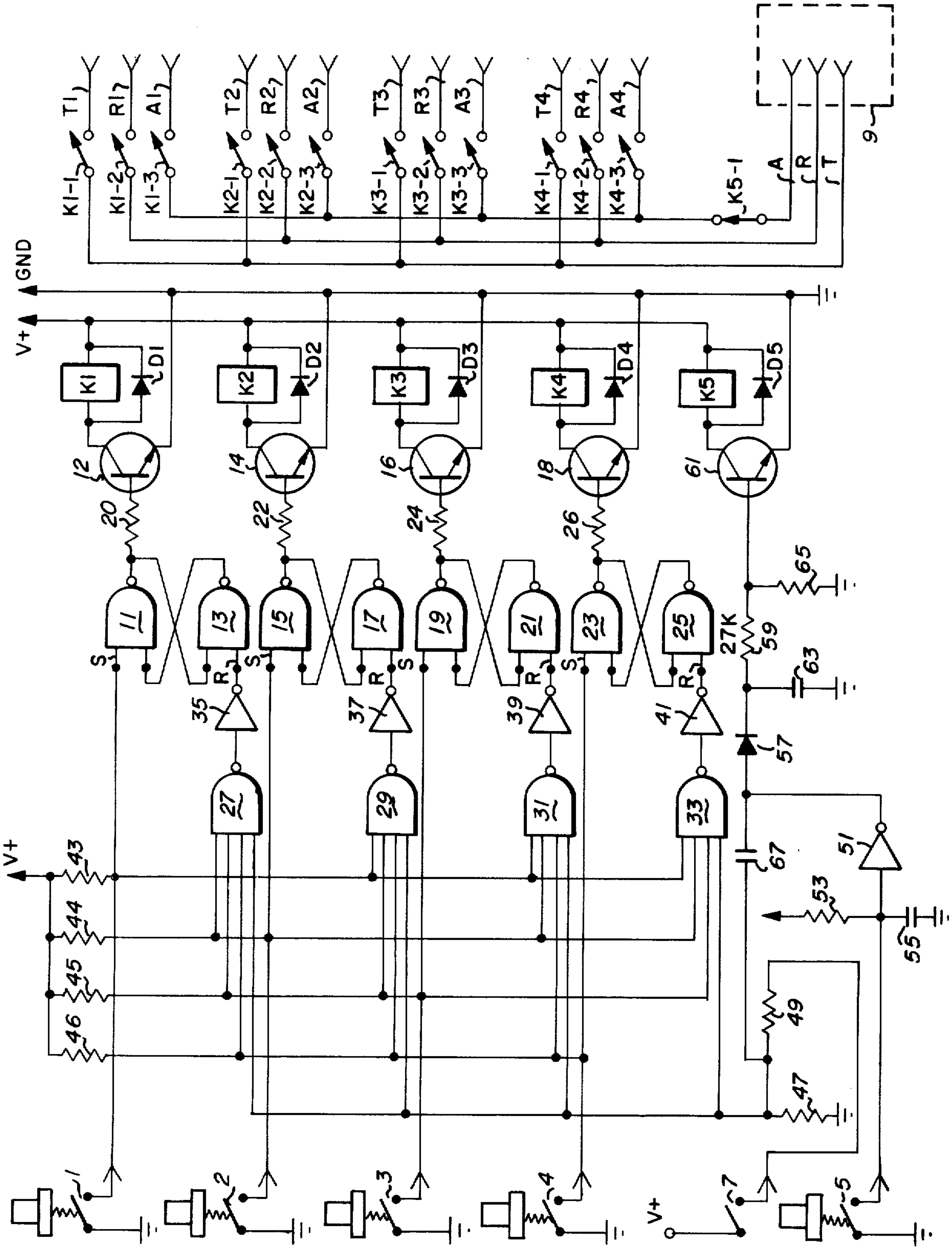
T1
R1
A1
T2
R2
A2
T3
R3
A3
T4
R4
A4
9
K1-1
K1-2
K1-3
K2-1
K2-2
K2-3
K3-1
K3-2
K3-3
K4-1
K4-2
K4-3
K5-1
A
R
T
GND
V+
K1
K2
K3
K4
K5
D1
D2
D3
D4
D5
12
14
16
18
61
20
22
24
26
65
11
13
15
17
19
21
23
25
S
R
27K
59
63
35
37
39
41
57
27
29
31
33
67
51
V+
43
44
45
46
53
55
49
47
1
2
3
4
7
5

PLURAL LINE SELECTOR APPARATUS FOR ENABLING SELECTION OF ONE OF A PLURALITY OF TELEPHONE LINES

BACKGROUND OF THE INVENTION

This invention relates to an electronic selector and, more particularly, to an electronic selector useful in connection with a telephone instrument for selecting one of a plurality of telephone lines.

A selector switch provides the means to establish an electrical circuit between a given circuit and one of a plurality of other circuits as desired. One familiar selector switch mechanism appears as part of an ordinary telephone instrument, particularly those telephone stations of a conventional key telephone system or an individual telephone instrument which have more than one line to which the instrument has access. In either system a series of pushbuttons, usually illuminated, are provided at the front of the telephone which are associated with individual telephone extension lines. The telephone user may select an individual telephone line over which to establish telephone communication. An additional switch is provided in this application, commonly termed the "hold" button. While the reader may not be familiar with the exact details, those selector switches as appear to be presently employed are mechanical and electromechanical in nature, hence when the button is pushed to access an individual telephone line, the mechanical parts produce a loud click. As is conventional in telephone selector switches used in this application, the depression of one button through mechanical means results in the restoration of the buttons associated with any other line.

SUMMARY OF THE INVENTION

It is an object of the present invention to provide an electronic selector switch that can replace the mechanical type selector switch employed in telephone instruments for line selection and hold application. Further in accordance therewith it is an object of the invention to provide an electronic selector switch mechanism particularly for telephone instruments which does not require a large physical force to actuate the selection and which eliminates most of the noise associated with the operation of these types of switches.

In accordance with the foregoing objects the invention includes a plurality of bistable electronic switches, one of which is associated with an individual trunk line of a similar plurality of trunk lines. The switch includes a first enabling or set input, as variously termed, for setting the electronic switch to a first or set condition, and a second disabling or reset input, as variously termed, for setting the electronic switch in a second or reset condition. A corresponding plurality of individual manually operable momentary contact switches are provided. Circuit means are employed which are connected to the output of any one switch for providing an input at the enable input of the corresponding bistable electronics switch with which that switch is associated, and for providing a disabling input to the disable inputs of all of the other bistable electronic switches with which that switch is not associated, and means are provided responsive to an individual bistable electronic switch being in the first or set condition for connecting the individual trunk line associated with such bistable electronic switch in circuit with the telephone unit.

Additionally in accordance with a further aspect of the invention an additional manually operable momentary contact switch, an additional electronic switch means, and a pulsing means are provided. The output of the momentary contact switch is connected to the pulsing means and directly or indirectly to the electronic switch means. Responsive to the depression of said switch, the electronic switch means momentarily opens one of the telephone circuit lines to establish a hold condition and in response to the release of the switch the pulsing means provides an input directly or indirectly to the disabling input of all of the aforecited bistable electronic switch means of the selector to set them all in the second or reset condition.

The foregoing objects and advantages of the invention as well as the structure characteristic of the invention is better understood from a consideration of the detailed description of a preferred embodiment of the invention which follows considered together with the FIGURE of the drawing.

DESCRIPTION OF THE PREFERRED EMBODIMENTS

The electronic selector, schematically illustrated, is herein described in connection with an application in a multi-line telephone instrument of conventional structure in which the selector has particular usefulness. In such application three electrical leads are to be connected in separate circuit with corresponding three leads of one of a plurality of telephone line circuits. Typically the three leads of a telephone line are designated the R or ring lead, the T or tip lead, and the S or sleeve lead or the A lead. Thus in the FIGURE, the conventional electrical and electronic circuitry of the telephone instrument represented by dash lines 9 is connected to the lines designated A, R, and T.

Similarly a plurality of trunk telephone lines are connected to the instrument depending upon the number of lines with which it is to have access. Four electrical lines are shown in the FIGURE, and each of those lines, as is conventional, consists of a T, R and A lead, which are designated T1, R1 and A1 for the first trunk line; T2, R2 and A2 for the second trunk line; T3, R3 and A3 for the third trunk line; and T4, R4 and A4 for the fourth trunk line.

In the FIGURE, five electrical switches, 1, 2, 3, 4 and 5, are illustrated. The switches are of conventional structure known as a "single pole single throw" spring return in which the switch contacts are normally open and which by manually depressing the "button" associated therewith closes its contacts to complete an electrical circuit therethrough, and, as designated by a spring, where upon release of the "button" the switch restores itself to its normally open contact position. Typically switches 1 through 5 are mounted on a panel, not illustrated, such as the front of a telephone instrument, so as to have the button portion thereof accessible.

Another single-pole single-throw switch 7 having normally open contacts symbolically represents a "hookswitch." Conventional telephone instruments contain a switch that is responsive to the presence or absence of the telephone handset in its cradle, referred to in the art as a "hookswitch."

A set of four relays of conventional structure, K1, K2, K3 and K4, suitably electromechanical Reed type relays, are provided. Relay K1 includes a set of three "make" contacts, K1-1, K1-2, and K1-3; relay K2 includes a set of three make contacts, K2-1, K2-2 and K2-3; relay K3 includes make contact sets K3-1, K3-2 and K3-3; and relay K4 includes make contact sets K4-1, K4-2 and K4-3. A fifth relay K5 is provided and includes a break contact K5-1. These relays are symbolically illustrated with the relay winding represented by a rectangle and with the mechanical detail of parts which actuate the contacts under control of the winding omitted.

The make contact of each of relay contact set K1-1, K1-2 and K1-3 is connected to a corresponding terminal T1, R1, and A1; similarly the make contacts of set K2-1, K2-2 and K2-3 are connected to T2, R2 and A2, respectively, the make contacts of set K3-1, K3-2 and K3-3 are connected to T3, R3 and A3, respectively; and the make contacts of set K4-1, K4-2 and K4-3 are connected to the terminals T4, R4 and A4, respectively. All of the pivot contacts of sets K1-1, K2-1, K3-1 and K4-1 are connected in common to lead T; all of the pivot contacts of sets K1-2, K2-2, K3-2 and K4-2 are connected in common to lead R and all of the pivot contacts of sets K1-3, K2-3 and K3-3 are connected in common to the break contact of set K5-1 of relay K5. The pivot contact of set K5 is connected in circuit with lead A.

A first pair of NAND gates, 11 and 13, are provided as illustrated with conventional symbols. The NAND gate is a conventional semiconductor electronic logic circuit device aptly described in the literature. Each of NAND gates 11 and 13 contains two inputs. The output of NAND gate 13 is electrically connected to one input of NAND gate 11. The output of NAND gate 11 in turn is connected to one input of NAND gate 13. Together so interconnected NAND gates 11 and 13 form a NAND gate "latch," which is a conventional bistable electronic switching device having a set input, designated S, and a reset input, designated R. Similarly a second pair of NAND gates 15 and 17 are provided and the output of NAND gate 17 is connected to an input of NAND gate 15 and the output of NAND gate 15 is connected to one of the two inputs to NAND gate 17 to form a second NAND gate latch. A third pair of NAND gates 19 and 21 are provided and the output of NAND gate 21 connected to one input of NAND gate 19 and the output of NAND gate 19 is connected to one input of NAND gate 21 to form a third NAND gate latch circuit. A fourth NAND gate latch is formed of NAND gate 23 and NAND gate 25. The output of NAND gate 25 is connected to one input of NAND gate 23 and the output of NAND gate 23 is connected in circuit with one input of NAND gate 25.

Transistors 12, 14, 16 and 18, of conventional structure, suitably of an NPN type, are provided. Each of the transistors as shown by the symbol includes a base, a collector and an emitter. The base of transistor 12 is connected electrically in series with a resistor 20 to the output NAND gate 11. The collector thereof is connected in series with the winding of relay K1 to the source +V. The emitter is connected to electrical ground potential. Similarly the base of transistor 14 is connected in series with a resistor 22 to the output of NAND gate 15 and the collector is connected in series with the winding of relay K2 to source +V and the emitter is connected to electrical ground potential. The base of transistor 16 is connected in series with a resistor 24 to the output of NAND gate 19; the collector thereof is connected electrically in series with the winding of relay K3 to source +V; and the emitter is connected to electrical ground potential. The base of transistor 18 is connected electrically in series with resistor 26 to the output of NAND gate 23; the collector thereof is connected in series with the winding of relay K4 to the source +V; and the emitter thereof is connected to electrical ground potential.

Diodes D1, D2, D3, and D4, which function as inductive voltage suppressors, are connected in shunt of relay windings K1, K2, K3, and K4, respectively, and are poled with their negative polarity terminal connected to the side of the relay winding that is connected to source +V.

Four additional NAND gates, 27, 29, 31 and 33, are provided.

Four inverters, 35, 37, 39 and 41, of conventional structure are similarly provided.

The input of each of the inverters is connected to the output of a corresponding one of the four input NAND gates. Thus the input to inverter 35 is connected to the output of NAND gate 27; input of inverter 37 to the output of NAND gate 29; the input of inverter 41 is connected to the output of NAND gate 33. And the outputs of the inverters are connected to the input of the NAND gate latch circuit which I characterize as a "disable" input. Thus the output of inverter 35 is connected to the input of NAND gate 13; the output of 37 is connected to the input of NAND gate 17; the output of inverter 39 is connected to the input of NAND gate 21; the output of inverter 41 is connected to the input of NAND gate 25.

A series of four resistors, 43, 44, 45 and 46, are connected at one end to source +V. The other end of resistor 43 is connected in circuit with the make contact of switch 1, and the remaining input to NAND gate 11, and to one input of each of NAND gates 29, 31 and 33, as illustrated by the wiring in the schematic. The other end of resistor 44 is connected in circuit with the make contact of switch 2, the remaining input to NAND gate 15, and to one input of each of the NAND gates 27, 31 and 33. The remaining end of the third resistor, resistor 45, is connected to the make contact of switch 3, the remaining input of NAND gate 19, and to an input of each of NAND gates 27, 19 and 33. The remaining end of the fourth resistor 46 is connected to the make contact of switch 4, the remaining input to NAND gate 23, and to an input of each of the NAND gates 27, 29 and 31.

Thus the make contact of each of the switches 1, 2, 3 and 4 is connected to the "set" input of a corresponding one of the NAND gate latch devices and to the "reset" input of each of the other or noncorresponding NAND gate latches, indirectly by three of the four NAND gates, 27, 29, 31 and 33.

The remaining or fourth input of each of the NAND gates 27, 29, 31 and 33 are connected electrically in common to one end of a resistor 47 and the other end of resistor 47 is connected to electrical ground potential.

One end of hookswitch 7 is connected to the source +V and the make contact thereof is connected in series with a resistor 49 to the ungrounded side of resistor 47. Suitably resistor 49 may be only one-tenth the resistance value of resistor 47.

One end of switch 5 is connected to electrical ground potential and the make contact thereof is connected to the input of an inverter 51. The input of inverter 51 is connected to the source +V in series with a bias resistor 53 and a capacitor 55 is connected between the input and electrical ground potential. The output of inverter 51 is connected to the anode polarity end of a diode 57. Diode 57 in turn has its cathode end connected to one end of a resistor 59 and in turn the other end of resistor 59 is connected in circuit to the base transistor 61. Transistor 61 is of conventional structure and includes a base, collector and emitter and is suitably an NPN type. The collector is as illustrated connected in series with the winding of relay K5 to source +V. Diode D5 is poled as illustrated and connected across relay winding K5 as an inductive voltage suppressor. The emitter of transistor 61 is connected to electrical ground potential. A capacitor 63 is connected to the cathode end of diode 57 and electrical ground potential, and a resistor 65 is connected between the base of transistor 61 and electrical ground potential. Suitably the time constant of the circuit comprising capacitor 63 and resistors 59 and 65 is on the order of 50 milliseconds.

The output of inverter 51 is also connected in series with a capacitor 67 to the ungrounded end of resistor 47.

Before proceeding to the description of operation of the illustrated embodiment of the invention it is believed helpful to refresh the recollection on the terminology used by one skilled in the art with respect to electronic switching circuits. A positive polarity voltage is described as a "high" and any voltage of ground potential or less is characterized as a "low." A NAND gate, or a "and not" gate, is a logic element which provides a "low" output only if all of its inputs, however many, are at a "high" input voltage. A transistor which is in the current conducting condition is said to be "on" whereas if it is in the noncurrent conducting condition it is said to be "off." A NAND gate latch is basically a bistable electronic switch—if one NAND gate is switched "on" the other NAND gate automatically is switched "off." And the output of the latch is in either one condition or the other. And an inverter is a conventional device which takes a "low" applied to its input and provides a " high" at its output, and vice versa, to essentially invert the input signal.

Consider now the operation of the selector switch in connection with the use of a telephone instrument with which this selector switch is associated. The telephone user desiring to make a call lifts the telephone handset from its cradle, the hookswitch contact 7, which functions as an On-Off switch for the circuit, closes and applies the voltage +V via resistor 49 to an input of each of NAND gates 27, 29, 31 and 33. All of the remaining inputs of such gates are also at a "high" supplied from source +V via the resistors 43, 44, 45 and 46. This changes the output condition of the NAND gates from a low, as represented by electrical ground potential through resistor 47, to a high. The part then selects the trunk telephone line over which he desires to communicate. Assume, by way of example, that the user desires a connection to first trunk line, the user momentarily depresses switch 1 which momentarily closes its contacts. This completes a circuit from ground to the set input of NAND gate 11 to place the input at a "low." Concurrently it is noted that three of the inputs to associated NAND gate 27 are at a high +V through resistor 44, 45 and 46, and the fourth input is also at a high and as a result the output of NAND gate 27 is at a low. This low is inverted by inverter 35 to a high at its output with a corresponding high at an input of NAND gate 13.

When the low is applied to the input of NAND gate 11, the output of NAND gate 11 goes high since both inputs must be high to have a low output. This high is applied to input of the associated NAND gate 13. Since both inputs of NAND gate 13 are now high, the output of this NAND gate goes low providing a low at a second input to NAND gate 11 so that the two NAND gates forming a NAND gate latch are now stable or latched in the described condition. Accordingly the first NAND gate latch is placed in a first condition in which a "high" appears and is maintained at the output of NAND gate 11.

The low applied by switch 1 to the input of NAND gate 11 is also applied to an input of each of the NAND gates 29, 31 and 33 and causes the output of those gates to go high which is inverted to a low and applied to the reset input of the associated NAND gate latches by an associated inverter 37, 39 and 41. This ensures that each of the remaining three NAND gate latches consisting of 15 and 17, 19 and 21, 23 and 25, is in the reset condition. The high at the output of NAND gate 11 is coupled via resistor 20 to the base of transistor 12 and transistor 12 is switched to its "on" condition. In so doing, current flows from source +V, relay winding K1, between the collector and emitter to ground. Relay K1 is energized and thereupon closes its make contacts K1-1, K1-2 and K1-3, to complete a circuit between the T1, R1 and A1 leads associated with trunk line 1 in circuit with the A, R and T leads associated with the user's telephone instrument. And a call is established or completed over the selected trunk line circuit.

The high at the output of NAND gate 11 is also applied to the input of NAND gate 13. With a high, the output of NAND gate 13 is low, hence upon removal or opening of switch 1, whereby the first input to NAND gate 11 returns to high, the other input of that gate remains at low and hence the output of NAND gate 11 remains high. Correspondingly the low to the reset inputs of the remaining NAND gate latches ensures that the output of the NAND gates 15, 19 and 23 to be low, or to switch them into that condition.

Assuming now that the party has completed the call over trunk line 1 and desires to place a call over trunk line 3, perhaps to answer a call which has come in over trunk line 3, or to place a call thereover. The user simply depresses pushbutton 3 momentarily and releases same. This places a momentary low at the input of NAND gate 19 of the third NAND gate latch and places a low at an input of each of NAND gates 33, 29 and 27. With a low at its input, the output of NAND gate 19 goes high. This high is applied to the input of associated NAND gate 21 which thereupon switches its output to a low and this, as is shown, is applied to the other input of the first NAND gate 19 in the NAND gate latch circuit to retain the NAND gates in this condition irrespective of the operation of switch 3. Thus as pushbutton switch 3 is released to remove the low at the first input and replace it with a high, the second input of NAND gate 19 is at low so as to maintain or latch the output of NAND gate 19 at high.

The low applied by switch 3 to each of NAND gates 27, 29, and 33 is inverted to high by the corresponding inverter 35, 37 and 41, and is thereby applied to the reset input of each of the first, second and fourth NAND gate latches to maintain or switch them into the reset condition wherein the outputs of same at gates 11, 15 and 23 is a "low." This is the same sequence of operation as occurred in a previous case. With the high at the output of NAND gate 19, transistor 16 switches on, energizes relay K3, which in turn operates its contacts K3-1, K3-2 and K3-3 to complete the connection between leads T3, R3 and A3 of trunk line 3 and the corresponding T, R and A lines of the telephone instrument.

Assume now that the party completes the call and returns the handset, not illustrated, to its cradle in the telephone instrument. In response, contact 7 of the hookswitch opens and removes the high from one side of resistor 47, placing a low at an input to each of the NAND gates 27, 29, 31 and 33. With a low at one input of such NAND gates the output thereof is high. The high is inverted by each of the inverters 35, 37, 39 and 41, which thereupon provides a low at their respective outputs. In turn the lows are applied to the corresponding reset input of NAND gates 13, 17, 21, 25 of the respective NAND gate latch circuits. With a low at the input of the NAND gates 13, 17, 21 and 25, the output of same must be high and in turn this high is applied to the corresponding inputs of the associated NAND gates 11, 15, 19 and 23, which in turn switch their outputs to low. The foregoing serves to switch the output of any of the four bistable latch gates that were in the "on" or second condition to the "off" or first condition and ensure a low output. Transistors 12, 14, 16 and 18 are thus biased at their respective base to the Off condition. Accordingly the associated relays K1 through K4 are or remain de-energized and the contacts are in or restore to the normal open condition.

The selector thus serves to simply and relatively noiselessly provide electrical circuit connections to one of a multiplicity of output circuits.

The operation of the "hold" aspect of the invention is next considered. Reference is made to the condition of the circuit elements in which a connection was established to the third trunk telephone line 3 as presented in the preceding description. In that condition the output of NAND gate 19 of the third NAND gate latch is at a high, and the base of relay driver transistor 16 thereby biases transistor 16 in the current conducting condition, transistor 16 is "on" and relay K3 is energized and its contacts K3-1, K3-2 and K3-3 are closed. To place a call on trunk line 3 on hold the user momentarily depresses and releases pushbutton switch 5, the "hold" button. Depression of the button closes contact 5 which places a low at the input of inverter 51 and, coincidentally, discharges capacitor 55. Inverter 51 inverts the low at its input to a high at its output. The high causes a current to flow from the output of inverter through diode 57 to charge capacitor 63 to a high and to apply the high through resistor 59 to the base of transistor 61. With a high applied to its base, transistor 61 switches into its On condition and causes current from source +V, the collector, the relay winding, the emitter to ground. Relay K5 is thus energized and opens its contacts K5-1 to interrupt the circuit between the A lead of the user's telephone instrument and the A lead of trunk line 3.

In a standard key telephone system, not illustrated, a hold condition is signaled to the system equipment by opening the A lead for an interval of approximately 40 or more milliseconds prior to opening or disconnect of the ring and tip leads, R and T. This sequence is sensed by the central key station equipment, not illustrated, which thereupon in a conventional manner places the trunk line 3 in a hold condition, so as not to disconnect the party at the other end of the telephone line.

Restoration of pushbutton 5 opens contact 5 and thereby removes the low from inverter 51 input. At the end of a short interval capacitor 55 charges up from the high through resistor 53 and thereupon the input of 51 is returned to high and the output of the inverter is switched to low. Accordingly no further current flows through diode 57 and the diode blocks discharge current from capacitor 63 from passing back to the inverter. Capacitor 63 commences to discharge through resistors 59 and 65 to dissipate the "high" voltage on capacitor 63 over a short interval of time. As the capacitor discharges, the voltage thereacross is lowered and the voltage across resistor 65, which is applied to the base of transistor 61, lowers. When the voltage decreases sufficiently, through continuing discharge of capacitor 63, transistor 61 switches to its Off condition and relay K5 is thereby de-energized. Accordingly, contacts K5-1 of relay K5 recloses to recomplete the circuit over the A lead. Concurrently, when the output of inverter 51 switches from a high to a low a momentary charging current flows from the source +V, hookswitch contact 7, through resistor 49 and into capacitor 67 to charge the capacitor. Initially this creates a large voltage drop or IR drop across resistor 49 and in effect a low pulse is generated or appears at the ungrounded end of resistor 47 until capacitor 67 is essentially charged.

The voltage drop across resistor 49 reduces and the ungrounded side of resistor 47 returns to a high after an interval of time. This momentary low pulse described is applied to an input of each of the NAND gates 27, 29, 31 and 33 via the conductive paths illustrated, and the NAND gates momentarily produce a high at the output, which in turn is inverted to low by inverters 35, 37, 39 and 41 and applied as a low to the reset input of the NAND gate latches, i.e. the inputs of NAND gates 13, 17, 21 and 25. As a result, any NAND gate latch in the set condition, such as the third NAND gate latch, consisting of NAND gates 19 and 21, is switched into its Off or reset condition, in a manner previously described. Accordingly any operated relay K1 through K4, such as relay K3 in the example, is de-energized and all of the contacts of the relays are opened. The party then returns the handset, not illustrated, to its cradle in the telephone instrument, not illustrated, and hookswitch contact 7 opens. In so doing the NAND gates 27, 29, 31 and 33 again have a low applied to their input. However since all four NAND gate latches have been restored to their first condition, there is no further operation of consequence.

On the other hand, the party may wish to select another trunk telephone line, for example, to reach the operator. By way of example, the user operates pushbutton No. 1 to establish a connection to trunk line 1 in the same manner as was described originally heretofore in connection with the description of selecting trunk line 1. At the completion of that call, the user hangs up and the selector circuit restores to normal.

Suitably by way of specific example, NAND gates 27, 29, 31 and 33 can be a CMOS Dual 4-INPUT NAND sold under the designation 4012; NAND gates 11, 13, 15, 17, 19, 21, 23, and 25 can be a CMOS Quad 2-INPUT NAND sold under the designation 4011; inverters 35, 37, 39 and 41 can be a 4009 type CMOS Hex Inverter; and transistors 12, 14, 16, 18 and 61 can be a type 2N4401.

As has been described, each of the NAND gate latches is a bistable electronic switch that remains in the condition in which it was last set. By energizing an "enable" or "set" input thereof the bistable switch is set from a first condition to a second and when thereafter the "disable" input thereof is energized the bistable switch is reset back into its second condition.

As is apparent from the foregoing description, the selector switch permits selection of a desired line circuit by electronic means and that avoids generation of substantial noise prevalent in present telephone selectors. The Reed relays produce no more than an indiscernible click and the touch-sensitive switches 1 through 5 can be silent operating types. The circuit thus eliminates the complicated, noisy, mechanical switches.

The foregoing preferred embodiment of the invention has been illustrated in connection with a telephone instrument containing access to four trunk lines. As is apparent, the unit can be enlarged to provide similar selection for a greater number of lines. For example, to add a fifth circuit one might have to add an additional touch switch and an additional NAND gate latch, switching transistor, relay and relay contacts, and substitute a five-input NAND gate for the four-input NAND gates illustrated, and to add an additional five-input NAND gate and inverter. If, as is the case, a five-input NAND gate is unavailable, various combinations of gates can be employed to multiple this arrangement in order to enlarge the capacity of the system. Thus, for example, to enlarge the system to eight lines using only available four-input NAND gates, one simply connects the output of each of two four-input NAND gates through inverters to the input of a third four-input NAND gate, and other obvious variations thereof. Other modifications, additions, substitutions are thus apparent.

Although I have described the circuit for conciseness in terms of "low" and "high" as the control voltages employed or derived in operation, these terms are used synonymously with any distinct control voltages, such as a first control voltage and a distinct second control voltage, inasmuch as those skilled in the art understand by known change of elements the low and high may be reversed.

As the reader appreciates, the aforedescribed selector switch has clear application in other than telephone systems, and is useful wherever one might wish to employ circuit selection.

The foregoing description of a preferred embodiment of the invention clearly illustrates to one skilled in the art how to make and use the invention. It is however expressly understood that my invention is not limited to the specific details of the preferred embodiment inasmuch as modifications, improvements or substitutions can be made without departing from my invention which are apparent to those skilled in the art. Accordingly it is requested that my invention be broadly construed within the full scope and breadth of the appended claims.

What I claim is:

1. A circuit selector comprising:

a first plurality of controlled switch means, each of said plurality having an input and operable from a first condition to a second condition in response to the application of a first signal voltage at its input for completing an electrical circuit during the application of said signal voltage;

a plurality of bistable electronic switch means, said plurality corresponding in number to said controlled switch means with one bistable switch means associated with a corresponding one of said controlled switch means, each bistable electronic switch means having a first enable input, a second disable input and an output and operable to a first condition to provide a first signal voltage at its output in response to a predetermined input signal applied at its first input and operable to a second condition to remove said first signal voltage at its output in response to a predetermined input signal applied at its second input;

means coupling said output of each said electronic switch means to input of a corresponding one of said controlled switch means;

a plurality of momentarily operable switch means, said plurality corresponding in number to said bistable electronic switch means and each one of said momentarily operable switch means being associated with a corresponding one of said bistable electronic switch means;

a plurality of electronic gate means, said plurality corresponding in number to said plurality of bistable electronic switch means, each one of said gate means having its output coupled in circuit to said second disable input of an associated one of said bistable switch means, and each of said momentarily operable switch means having an output coupled in circuit with the first enable input of the associated one of said bistable electronic switch means, and additionally coupled to an input of all of said gate means except that one of said gate means associated with the associated one of said bistable electronic switch means;

wherein the operation of a selected one of said momentarily operable switch means causes said bistable switch means associated therewith to become placed in the first condition and thereby operate an associated controlled switch means and concurrently to restore any of the remaining bistable switch means as may be in the first condition to the second condition;

an additional momentarily operable switch means having an output and operable momentarily from a first condition to a second condition to produce momentarily a predetermined output voltage at its output;

an additional controlled switch means having an input and operable from a first condition to a second condition in response to the application of a predetermined voltage to its input for interrupting an electrical circuit during the presence of said predetermined input voltage;

control circuit means coupled to the output of said additional momentarily operable switch means and responsive to the operation of said switch means to the second condition for providing a predetermined voltage for a predetermined time to the input of said additional controlled switch means and for providing an output to the second disable input of each of said bistable electronic switch means upon restoration of said additional switch means to its first condition to reset any of said bistable switch means as may be in the first condition to the second condition.

2. The invention as defined in claim 1 further comprising in combination therewith a first common circuit, a plurality of output circuits corresponding in number with said controlled switch means, with one of said plurality being associated with one of said controlled switch means;

each one of said controlled switch means having contact means connected between said common circuit and a corresponding one of said output circuits for completing a respective circuit therebetween during the time when the associated controlled switch means is in its second condition; and wherein said additional controlled switch means includes contacts connected in series circuit between said common circuit and said first plurality of controlled switch means for interrupting said circuit during the time when said additional controlled switch means is in its second condition.

3. The invention as defined in claim 1 wherein said controlled switch means comprises:

a transistor switch; and a relay, said relay having its winding coupled to the output of said transistor switch, and said relay further comprising a plurality of relay contacts.

4. A selector having a plurality of output circuits and a common circuit for selectively completing a current path between said common and one of said output circuits comprising:

a first plurality of manually operable momentary contact switches, each of said first plurality being associated with one of a corresponding plurality of circuits to be connected to a common circuit;

a corresponding plurality of bistable electronic switch means, said switch means normally in a first condition and operable to a second condition, each of said bistable electronic switch means including:

a first input for enabling said electronic switch means to a first condition, and a second disable input for enabling said electronic switch means into a second condition;

a first plurality of output switch means, each of said switch means responsive to the associated one of said bistable switch means being in the second condition for completing an electrical circuit between a corresponding circuit and said common circuit;

a plurality of NAND gates, said plurality corresponding in number with said plurality of bistable switch means, each said NAND gate including a plurality of inputs and an output;

a plurality of voltage inverter means, each one of said inverter means connected in between the output of a corresponding one of said NAND gates and said disable input of a corresponding one of said bistable electronic switch means;

a plurality of resistor means corresponding in number to said plurality of bistable switch means;

means connecting each resistor means between a source of voltage at one end and at the other end in circuit with one said contact switch means, to the input of the bistable electronic switch means associated with said contact switch means and to a NAND gate input of the respective ones of said plurality of NAND gates associated with the remaining bistable electronic switch means;

bias resistor means connected between electrical ground potential and one input of each of said NAND gate means;

hookswitch means;

second resistor means having a substantially lesser resistance than said bias resistor means;

means connecting said hookswitch means and said second resistor means in series circuit between said source of voltage and said same NAND gate inputs as said bias resistor means;

said hookswitch means being in a normally open condition and operable when closed to complete a circuit between said source and said inputs to change the voltage thereat;

additional momentary contact switch means having a normally open position and operable to a closed position, one contact thereof connected to electrical ground potential;

voltage inverter means;

means connecting the input of said inverter to the remaining contact of said additional switch;

electronic switch means having an input and output and responsive to a high voltage at its input for switching from a first to a second condition and responsive to a low at its input for switching from the second condition to the first condition;

means responsive to said electronic switch means being in said first condition for interrupting the circuit between said common and a selected one of said outputs;

means connecting the output of said inverter to said input of said electronic switch means;

a capacitor;

means connecting one end of said capacitor in common circuit with said bias resistor means and said inputs of said NAND gates and means connecting the other end of said capacitor in circuit with said output of said inverter; and an electric circuit whereby operation of said additional switch means results in an open circuit between said common circuit and said output circuits and restoration thereof results in the generation of a low pulse to the input of all said NAND gates and any bistable switch means that is in the first condition is restored to the second condition.

5. The invention as defined in claim 4 wherein said bistable electronic switch means comprises a NAND gate latch circuit.

6. A line selection device for coupling a telephone instrument circuit associated with a telephone instrument of the type having a hookswitch to a selected one of a plurality of trunk telephone line circuits comprising:

a first plurality of manually operable spring-return single-pole single-throw selection switches, each of said switches containing a pair of electrical contacts in a normally open circuit for closing an electric circuit therethrough in response to placement to the switch operate condition, said plurality of selection switches corresponding in number to the plurality of output telephone lines with one of the switches being associated with a corresponding one of said trunk line circuits;

a source of high voltage and a source of low reference voltage, one source being of a higher voltage level relative to the other;

means connecting one contact of each selection switch to said source of low reference voltage;

a first plurality of electromechanical relay means, said plurality corresponding in number to said plurality of selection switches and one of said relay means associated with one of said first switch means, each of said relay means including a winding, and a set of contacts normally open responsive to energization of said winding for operating to the closed position contact; each of said contact sets of said relays connected between a common circuit in said telephone instrument and a corresponding one of said plurality of trunk telephone line circuits;

a corresponding first plurality of NPN type transistors, each of said plurality being associated with a corresponding one of said relay means in said first plurality of relay means, each of said transistors having a base, a collector, and an emitter;

means connecting each relay winding electrically in series between said source of high voltage and the collector of a corresponding one of said transistors;

a plurality of NAND gate latches, said plurality corresponding in number to said first plurality of switches and transistors with each NAND gate latch being associated with a corresponding one of said transistors and said switches, each of said NAND gate latches including a first input, a second input, and a first output, each said NAND gate latch means normally in a first condition having a low voltage at said second output and responsive to a low voltage at its first input for switching to a second condition having a high at its said second output and further responsive to a high applied at its second input for switching back to said first condition;

means connecting said first output of each one of said plurality of NAND gate latches to the base of a corresponding one of said transistors for energizing said transistor means in response to the establishment of the corresponding NAND gate latch means in the second condition;

a first plurality of resistor means corresponding in number to the number of NAND gate latch means, each having a first and a second end, one end of each resistor means being connected to said source of high voltage;

a plurality of NAND gates corresponding in number to the plurality of NAND gate latches, each of said NAND gates having a plurality of separate inputs corresponding in number to said NAND gate latch means and an output, each of said NAND gates normally providing a low voltage at the output thereof and responsive to a low voltage at any one of its plurality of inputs for providing a high voltage at the output thereof;

each one of said NAND gates being associated with a corresponding one of said NAND gate latch means;

a first plurality of voltage inverter means, said plurality corresponding in number to said plurality of NAND gates, each of said inverter means containing an input and an output for providing a low voltage or a high voltage at the output thereof in response to the input thereof having applied thereto either a high voltage or low voltage, respectively, each one of said inverter means having an input coupled to the output of a corresponding one of said NAND gates and its output connected to said second input of a corresponding one of said NAND gate latch means;

means coupling said remaining end of each one of said first plurality of resistor means electrically in common with the remaining contact of a corresponding one of said selector switch means, said first input of a corresponding one of said NAND gate latch means and one input of each of those of said NAND gate means not associated with said respective one of said NAND gate latch means, whereby operation of a selector switch means associated therewith applies a low voltage to said first input of said NAND gate latch means associated therewith and to one input of each of the non-associated NAND gates;

bias resistor means connected at one end to said low source;

means connecting the remaining end of said bias resistor means electrically in common to one separate input of each of said NAND gate means;

means for connecting said source of high voltage in circuit with one end of said hookswitch of said telephone instrument, said hookswitch means, normally open, for closing an electrical circuit upon removal of a telephone handset from its cradle;

second resistor means, said second resistor means having a substantially lesser resistance than said bias resistor means;

means for connecting the remaining end of said hookswitch means and said second resistor means in an electrical series to the remaining end of said bias resistor.

7. The invention as defined in claim 6 further comprising in combination therewith:

holding circuit means for momentarily interrupting any established telephone line circuit and for causing disengagement of said selected circuit connection comprising electromechanical type relay means, said relay having a winding and a set of normally closed contacts operable to the open condition in response to energization of said winding, means connecting said contact set electrically in series with said telephone instrument circuit;

transistor means of the NPN type having a collector, an emitter and a base;

means connecting said relay winding electrically in series between said source of high voltage and said collector and means electrically connecting said emitter to said source of low reference voltage;

a manually-operable normally open spring-return single-pole single-throw switch, said switch having a pair of electrical contacts for closing an electrical circuit through said contacts in response to said switch being in the operated condition;

voltage inverter means having an input and an output for producing a high voltage at its output in response to presence of a low voltage applied to its input;

means connecting said pair of contacts of said switch means in an electrical series circuit between said source of low voltage and said input of said inverter means;

resistor means connected between said source of high voltage and said input of said inverter means whereby said inverter output is normally low;

diode means having an anode and a cathode;

third resistor means;

means connecting said third resistor means between said base and said diode anode;

fourth resistor means connected between said base and said source of reference low voltage;

first capacitor means connected between said diode cathode and said source of reference low voltage adapted to be charged to a positive high voltage through said diode and to be discharged over a predetermined integral third and fourth resistor means;

means electrically connecting said output of said inverter means in circuit with said diode anode and second capacitor connecting said output of said inverter means to said remaining end of said bias resistor means;

whereby operation of said switch means results in operation of said relay means to interrupt said telephone instrument circuit for a predetermined interval irrespective of the operated condition of any one of said first plurality of relays, and whereby restoration of said switch means results in the generation of a pulse of low voltage which is passed from the remaining end of said bias resistor means to an input of each of said NAND gates to cause any associated NAND gate latch theretofore in its second condition to revert to its first condition and for the one of said first plurality of relay means associated therewith to be de-energized to restore and disengage any connection between said telephone instrument circuit and any telephone trunk line circuit.

* * * * *